J. Cochrane,
Gas Meter,
N° 34,670. Patented Mar. 18, 1862.
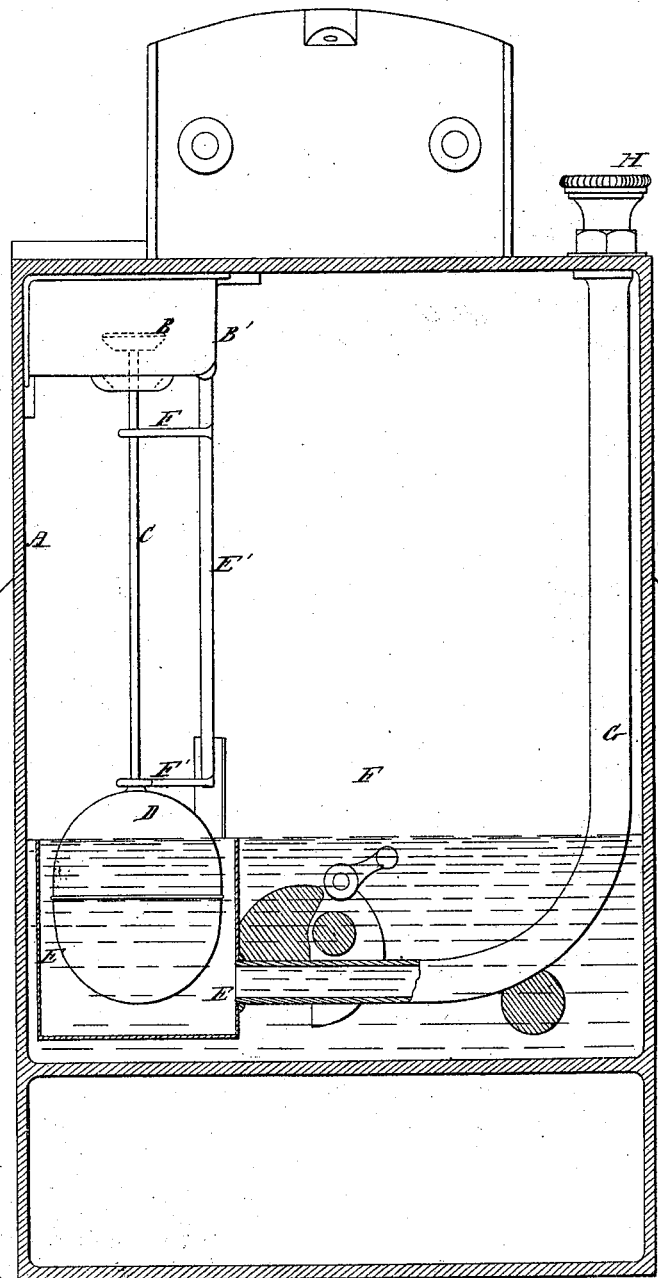
Witnesses.
H. Henry Jonnison
Henry H. Shew.
Inventor:
James Cochrane

UNITED STATES PATENT OFFICE.

JAMES COCHRANE, OF HARBURN, COUNTY OF MIDLOTHIAN, NORTH BRITAIN.

IMPROVEMENT IN WET GAS-METERS.

Specification forming part of Letters Patent No. 34,670, dated March 18, 1862.

*To all whom it may concern:*

Be it known that I, JAMES COCHRANE, of Harburn, in the county of Midlothian, North Britain, have invented certain Improvements in Wet Gas-Meters; and I do hereby declare the following to be a full, clear, and exact description of the same, reference being had to the accompanying drawings, and to the letters of reference marked thereon.

This invention relates to a peculiar arrangement of wet gas-meter, whereby the perpetration of fraud by the extraction of a portion of the water from the meter through the water-supply pipe will be frustrated, as in the event of any appreciable amount of water being extracted from the meter through such source the gas will be instantly shut off by the closing of the gas-inlet valve, while the proper water-level in the measuring-chamber of the meter will remain unaltered. This object is attained by inclosing the ordinary existing float of the gas-inlet valve in a box or chamber which is entirely separate or distinct from the main water-chamber and measuring-compartment of the meter, and by connecting the lower end of the water-supply pipe with this separate float box or chamber in lieu of with the main water-chamber, so that any water which may be extracted from the meter through the water-supply pipe by the aid of cotton-wick, siphons, or other appliances, as has been frequently done heretofore, will be taken from the float-box and will not consequently affect the level of the water in the measuring-chamber. As this float-box is only made to contain just sufficient water to buoy up the float, it follows that when any water is extracted therefrom the float will immediately descend, and by closing the gas-inlet valve will shut off the gas from the meter.

The accompanying drawing represents a vertical section (full size) through the front chamber of an ordinary wet gas-meter, showing such parts only as are necessary to illustrate my improvements.

A is the outer casing of the meter; B, the gas-inlet valve, on the spindle C of which is fitted in the usual manner the float D.

E is a box or open vessel, which is inserted into the front chamber of the meter and entirely surrounds and isolates the float D from the main water-chamber F. This box is supported by the rod E', to the lower end of which it is soldered, while the upper end of the rod is soldered to the casing B' of the gas-inlet valve.

F' F' are two guides attached to the rod E' and serving to guide the spindle of the valve and float.

G is the water-supply pipe, which is bent in such a manner as to enable its lower end to be connected with and open into the float-box or inclosing-vessel E. The remaining portions of the meter are of the ordinary well-known construction. On supplying the meter with water the cap H is unscrewed and the water poured down the water-supply pipe into the float-box, whence it flows over the edge thereof into the water-chamber F till it attains the proper level therein.

These improvements may be readily applied to new wet gas-meters by simply inserting therein a partition extending from the front to the back of the front chamber of a height not less than that of the proper level, so as to form a separate chamber or compartment to receive the float.

If preferred, the lower end of the water-supply pipe may be bent so as to dip into the float box or chamber vertically from the top in place of entering horizontally therein from the side, as shown in my drawing; but it should descend to within a short distance from the bottom of the float box or chamber, so as to insure its always being sealed by the water contained therein.

What I claim as my invention of improvements in wet gas-meters is—

The inclosing of the float of the gas-inlet valve in a special chamber or compartment which is separate and distinct from the main water or measuring chamber of the meter, and the introduction of the lower end of the water-supply pipe into such separate chamber, for the purpose hereinbefore described.

In testimony whereof I have signed my name to this specification in the presence of two subscribing witnesses.

JAMES COCHRANE.

Witnesses:
J. HENRY JOHNSON,
HENRY H. SHEW.